United States Patent
Kobayakawa et al.

(10) Patent No.: US 10,215,204 B2
(45) Date of Patent: Feb. 26, 2019

(54) CLAMPING BAND

(71) Applicant: Suncall Corporation, Kyoto-shi, Kyoto-fu (JP)

(72) Inventors: Hiroya Kobayakawa, Kyoto (JP); Toshiaki Yamashita, Kyoto (JP)

(73) Assignee: Suncall Corporation, Kyoto-shi, Kyoto (JP)

( * ) Notice: Subject to any disclaimer, the term of this patent is extended or adjusted under 35 U.S.C. 154(b) by 48 days.

(21) Appl. No.: 15/503,353

(22) PCT Filed: Dec. 5, 2014

(86) PCT No.: PCT/JP2014/082195
§ 371 (c)(1),
(2) Date: Feb. 10, 2017

(87) PCT Pub. No.: WO2016/088239
PCT Pub. Date: Jun. 9, 2016

(65) Prior Publication Data
US 2017/0227030 A1 Aug. 10, 2017

(51) Int. Cl.
*F16B 2/08* (2006.01)

(52) U.S. Cl.
CPC ...................... *F16B 2/08* (2013.01)

(58) Field of Classification Search
CPC ......... F16B 2/08; F16L 33/035; F16L 33/025; Y10T 24/1457; Y10T 24/1478; Y10T 24/148; Y10T 24/1469; F16J 3/042
See application file for complete search history.

(56) References Cited

U.S. PATENT DOCUMENTS

| RE33,744 | E | * | 11/1991 | Oetiker | ................. | B65D 63/02 |
| | | | | | | 24/20 EE |
| 5,138,746 | A | * | 8/1992 | Ojima | ...................... | F16B 2/08 |
| | | | | | | 24/20 CW |

(Continued)

FOREIGN PATENT DOCUMENTS

| JP | 63-119726 U | 8/1988 |
| JP | 03-209035 A | 9/1991 |

(Continued)

OTHER PUBLICATIONS

Office Action in JP 2013-190710, dated Jun. 16, 2017, 4 pages.

(Continued)

*Primary Examiner* — Robert Sandy
*Assistant Examiner* — Rowland Do
(74) *Attorney, Agent, or Firm* — Sterne, Kessler, Goldstein & Fox P.L.L.C.

(57) ABSTRACT

A region extending over a predetermined distance from a first latch claw center portion, out of an end part on one side in the longitudinal direction of a first latch claw opening, toward one side in the longitudinal direction is bulged radially inward to form a first latch claw while both sides of the center portion do not form the first latch claw. A region extending over a predetermined distance from a second latch claw center portion, out of an end part on the other side in the longitudinal direction of a second latch claw opening, toward the other side in the longitudinal direction is bulged radially outward to form a second latch claw while both sides of the center portion do not form the second latch claw.

8 Claims, 5 Drawing Sheets

(56) References Cited

U.S. PATENT DOCUMENTS

| | | | | |
|---|---|---|---|---|
| 5,375,299 A * | 12/1994 | Nagano | ............... | F16D 3/845 |
| | | | | 24/20 R |
| 5,797,168 A * | 8/1998 | Nagano | ............... | F16L 33/035 |
| | | | | 24/20 CW |
| 7,013,534 B2 * | 3/2006 | Nagano | ............... | F16L 33/035 |
| | | | | 24/20 EE |
| 2003/0101544 A1 * | 6/2003 | Kitamura | ............... | F16J 3/042 |
| | | | | 24/20 CW |
| 2006/0123604 A1 * | 6/2006 | Ogino | ............... | A43C 11/00 |
| | | | | 24/68 R |
| 2009/0049655 A1 * | 2/2009 | Ikeda | ............... | F16D 3/843 |
| | | | | 24/16 R |
| 2009/0172924 A1 * | 7/2009 | Ito | ............... | F16B 2/08 |
| | | | | 24/20 CW |
| 2011/0173779 A1 * | 7/2011 | Meier | ............... | F16L 33/025 |
| | | | | 24/19 |
| 2014/0201955 A1 * | 7/2014 | Ogino | ............... | F16J 3/042 |
| | | | | 24/16 R |

FOREIGN PATENT DOCUMENTS

| | | |
|---|---|---|
| JP | 07-198077 A | 8/1995 |
| JP | 2004-176753 A | 6/2004 |
| JP | 2005-207528 A | 8/2005 |

OTHER PUBLICATIONS

Written Opinion for International Application No. PCT/JP2014/082195, The International Bureau of WIPO, dated Jun. 15, 2017, 8 pages.

* cited by examiner

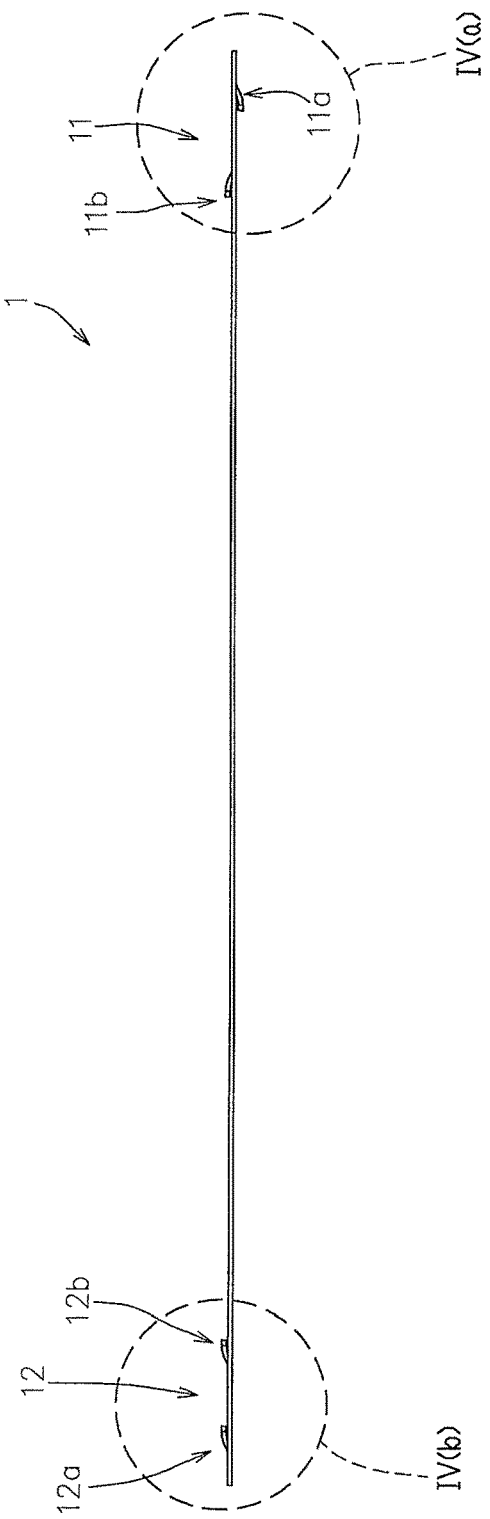

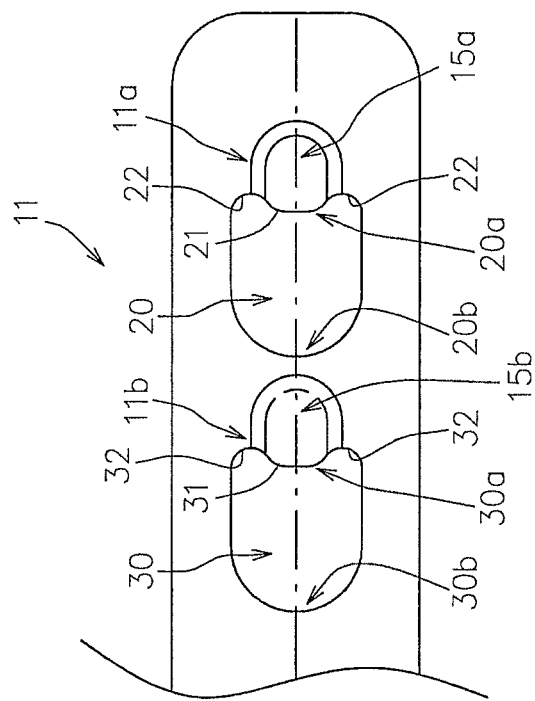
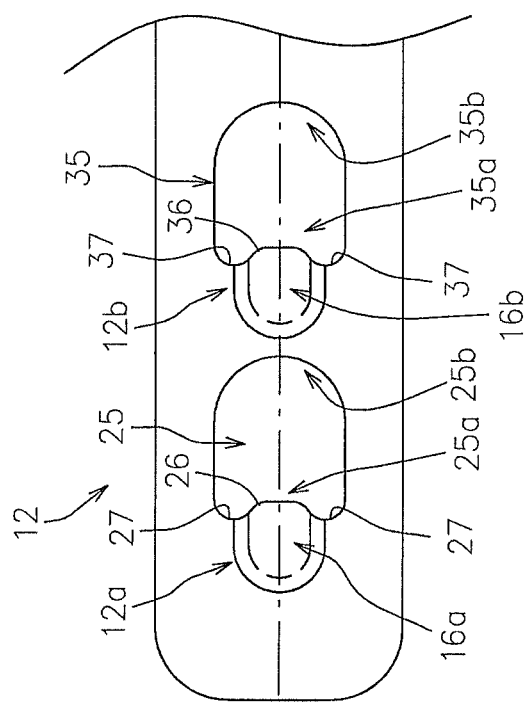

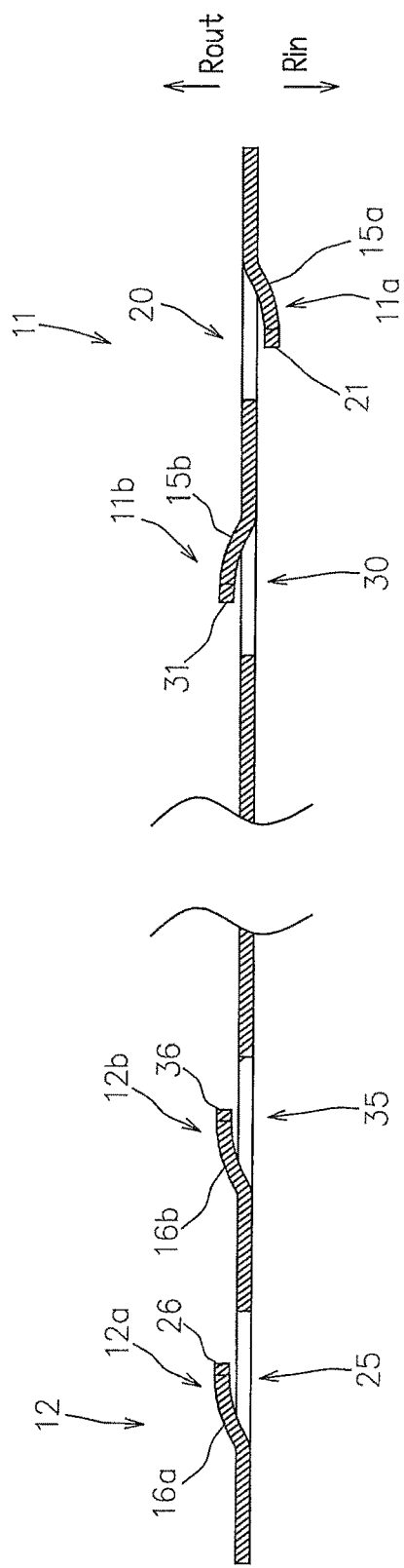

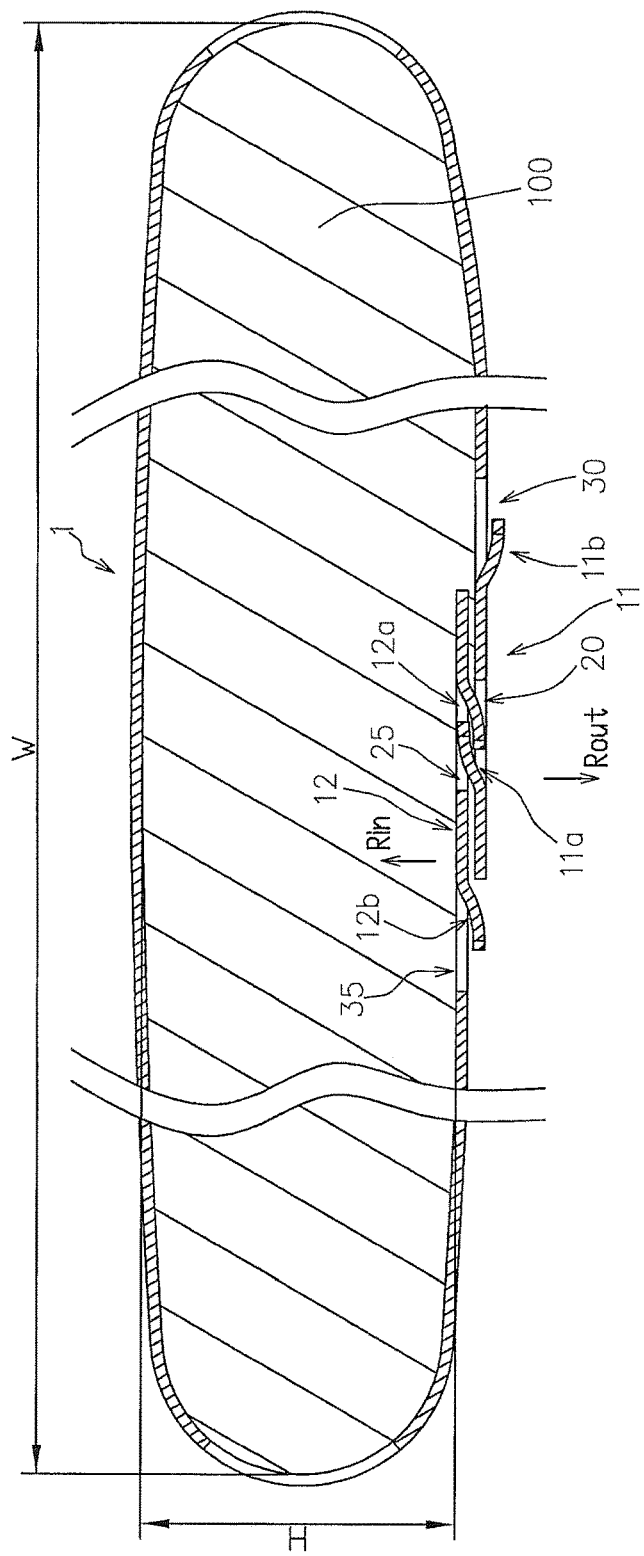

United States Patent: US 10,215,204 B2

CLAMPING BAND

FIELD OF THE INVENTION

The present invention relates to a clamping band to be wound around an outer circumference of a fastening target.

BACKGROUND ART

Elongated clamping bands have already been proposed and used, that are configured so as to be wound around the outer circumference of a fastening target in such a manner that a first region on one side in the longitudinal direction overlaps from radially outside a second region on the other side in the longitudinal direction, wherein first and second latch claws respectively provided in the first region and the second region can be engaged with and disengaged from each other, and the clamping band stays wound around the fastening target by the first and second latch claws being engaged (see, for example, Patent Literature 1 below).

The first and second latch claws are formed by utilizing first and second latch claw openings respectively formed in the first and second regions.

Specifically, a first end part on one side in the longitudinal direction of the first latch claw opening projects toward the other side in the longitudinal direction as viewed from above. A region extending from the first end part toward one side in the longitudinal direction over a predetermined distance is pressed to bulge toward a direction in which the region faces radially inward when the clamping band is wound, and thus the first latch claw is formed, with the first end part being a free end.

Likewise, a second end part on the other side in the longitudinal direction of the second latch claw opening projects toward one side in the longitudinal direction as viewed from above. A region extending from the second end part toward the other side in the longitudinal direction over a predetermined distance is pressed to bulge toward a direction in which the region faces radially outward when the clamping band is wound, and thus the second latch claw is formed, with the second end part being a free end.

The clamping band is wound around a fastening target in the following manner.

That is, the clamping band is wound around the outer circumference of a fastening target sequentially from the second region to the first region to cause the first region to overlap the second region from radially outside and engage the first latch claw with the second latch claw, and thereby the clamping band can stay wound around the fastening target against the intrinsic resilience of the clamping band.

Meanwhile, in conventional clamping bands, the entirety of the first end part of the first latch claw opening forms the free end of the first latch claw, and the entirety of the second end part of the second latch claw opening forms the free end of the second latch claw, and it is thus difficult to increase the bulging heights of the first and second latch claws.

That is, the first end part of the first latch claw opening and the second end part of the second latch claw opening continue without interruption into the non-opening region of the clamping band.

Accordingly, in order to increase the bulging heights of the first and second latch claws, a great force needs to be applied during pressing, which possibly results in deformation of the clamping band in some cases.

PRIOR ART DOCUMENT

Patent Document

Patent document 1: Japanese Unexamined Patent Publication No. 2005-207528

SUMMARY OF THE INVENTION

The present invention has been conceived in view of the conventional art described above, and an object is to provide a clamping band wherein sufficient heights can be effortlessly imparted to first and second latch claws that are respectively provided on one side and the other side in the longitudinal direction.

In order to achieve the object, the present invention provides a clamping band, which stays wound around a fastening target by an engagement of first and second latch claws, which are respectively provided in a first region on one side in a longitudinal direction and a second region on the other side in the longitudinal direction of the clamping band, in a state that the first region is wound around an outer circumference of the fastening target to overlap the second region from radially outside, wherein the first and second regions have first and second latch claw openings, respectively; an end part on one side in the longitudinal direction of the first latch claw opening includes a first latch claw center portion positioned in a center in a width direction to form a free end of the first latch claw, and a pair of side portions positioned on respective sides in the width direction of the first latch claw center portion and positioned more toward one side in the longitudinal direction than the first latch claw center portion is; the first latch claw is formed by pressing a region extending over a predetermined distance from the first latch claw center portion toward one side in the longitudinal direction to bulge toward a direction in which the first latch claw faces radially inward when the clamping band is wound; an end part on the other side in the longitudinal direction of the second latch claw opening includes a second latch claw center portion positioned in the center in the width direction to form a free end of the second latch claw, and a pair of side portions positioned on respective sides in the width direction of the second latch claw center portion and positioned more toward the other side in the longitudinal direction than the second latch claw center portion is; and the second latch claw is formed by pressing a region extending over a predetermined distance from the second latch claw center portion toward the other side in the longitudinal direction to bulge toward a direction in which the second latch claw faces radially outward when the clamping band is wound.

In the clamping band according to the present invention, the end part on one side in the longitudinal direction of the first latch claw opening formed at the first region of the clamping band, the first region being positioned radially outward when the clamping band is wound around the fastening target, includes the first latch claw center portion positioned in a center in the width direction of the clamping band to form the free end of the first latch claw, and the pair of side portions positioned on respective sides in the width direction of the first latch claw center portion and positioned more toward one side in the longitudinal direction than the first latch claw center portion is. The first latch claw is formed by pressing a region extending over a predetermined distance from the first latch claw center portion toward one side in the longitudinal direction to bulge toward a direction in which the first latch claw faces radially inward when the clamping band is wound.

The end part on the other side in the longitudinal direction of the second latch claw opening formed at the second region of the clamping band, the second region being positioned radially inward when the clamping band is wound around the fastening target, includes the second latch claw center portion positioned in the center in the width direction of the clamping band to form a free end of the second latch claw, and the pair of side portions positioned on respective sides in the width direction of the second latch claw center portion and positioned more toward the other side in the longitudinal direction than the second latch claw center portion is. The second latch claw is formed by pressing a region extending over a predetermined distance from the second latch claw center portion toward the other side in the longitudinal direction to bulge toward a direction in which the second latch claw faces radially outward when the clamping band is wound.

The thus configured clamping band according to the present invention makes it possible to raise the bulging heights of the first and second latch claws without difficulty. With using the clamping band in which the bulging heights of the first and second latch claws are raised, it is possible to enhance workability of winding the clamping band around the fastening target to engage the first and second latch claws, and effectively prevent the clamping band from being unintentionally released from the fastening target.

The clamping band is preferably provided with a first tool engagement claw opening for forming a first tool engagement claw on the other side in the longitudinal direction of the first latch claw opening, and a second tool engagement claw opening for forming a second tool engagement claw on one side in the longitudinal direction of the second engagement claw opening.

An end part on one side in the longitudinal direction of the first tool engagement claw opening includes a first tool engagement claw center portion positioned in the center in the width direction to form a free end of the first tool engagement claw, and a pair of side portions positioned on respective sides in the width direction of the first tool engagement claw center portion and positioned more toward one side in the longitudinal direction than the first tool engagement claw center portion is. The first tool engagement claw is formed by pressing a region extending over a predetermined distance from the first tool engagement claw center portion toward one side in the longitudinal direction to bulge toward a direction in which the first tool engagement claw faces radially outward when the clamping band is wound.

An end part on the other side in the longitudinal direction of the second latch claw opening includes a second latch claw center portion positioned in the center in the width direction to form a free end of the second latch claw, and a pair of side portions positioned on respective sides in the width direction of the second latch claw center portion and positioned more toward the other side in the longitudinal direction than the second latch claw center portion is. The second latch claw is formed by pressing a region extending over a predetermined distance from the second latch claw center portion toward the other side in the longitudinal direction to bulge toward a direction in which the second latch claw faces radially outward when the clamping band is wound.

Preferably, the first and second latch claw center portions may have bulging heights greater than a plate thickness of the clamping band.

In one embodiment, an easily bendable structure is provided in a first position halfway in the longitudinal direction between the first latch claw and an intermediate position halfway in the longitudinal direction between the first and second latch claws, and in a second position halfway in the longitudinal direction between the intermediate position and the second latch claw.

Preferably, the easily bendable structure may have a first opening that extends in the longitudinal direction across the first position and a second opening that extends in the longitudinal direction across the second position.

BRIEF DESCRIPTION OF THE DRAWINGS

FIG. 2 is a side view of the clamping band in the initial state shown in FIG. 1.

FIGS. 3A and 3B are enlarged views of a III(a) part and a III(b) part in FIG. 1, respectively.

FIGS. 4A and 4B are enlarged views of a IV(a) part and a IV(b) part in FIG. 2, respectively.

FIG. 5 is a vertical cross-sectional front view of the clamping band wound around a fastening target.

EMBODIMENT FOR CARRYING OUT THE INVENTION

Figure 1:
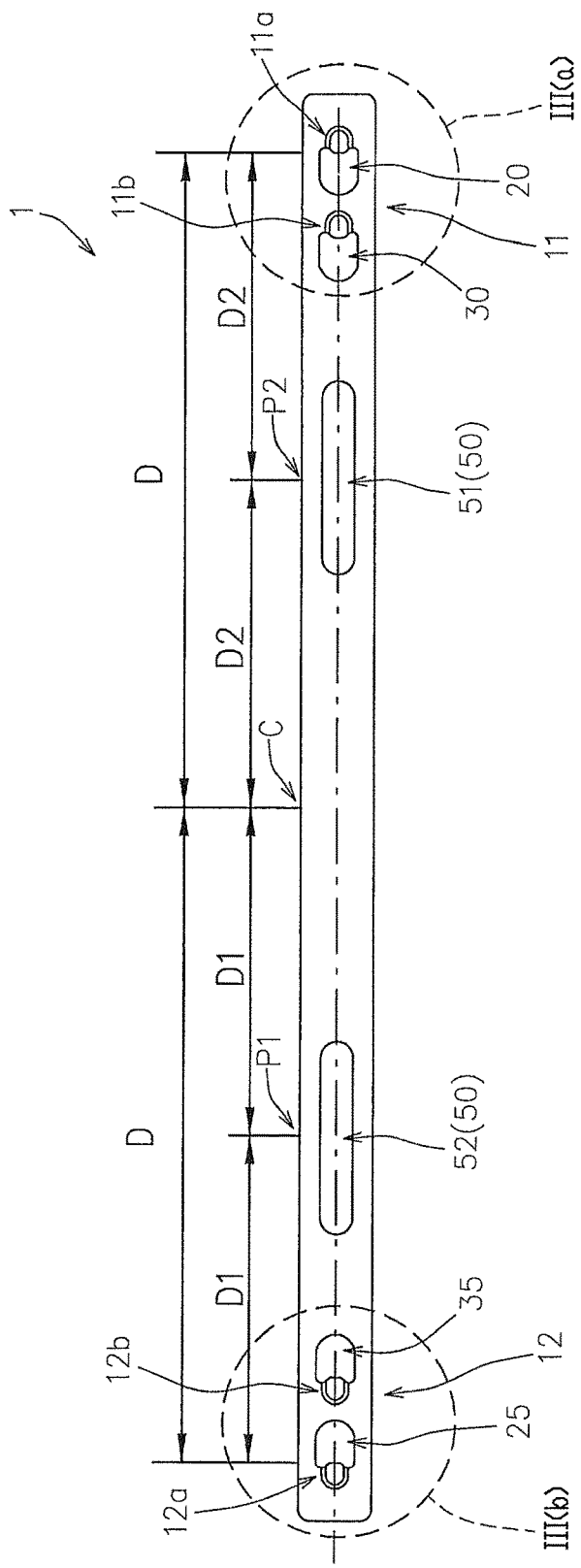
FIG. 1 is a plan view of a clamping band according to one embodiment of the present invention, wherein the clamping band is in an initial state before being wound around a fastening target.

Hereinafter, a preferable embodiment of the clamping band according to the present invention will now be described with reference to the appended drawings.

FIG. 1 is a plan view of a clamping band 1 according to this embodiment, wherein the clamping band 1 is in an initial state before being wound around a fastening target.

FIG. 2 shows a side view of the clamping band 1 in the initial state.

FIGS. 3A and 3B show enlarged views of a III(a) part and a III(b) part in FIG. 1, respectively.

FIGS. 4A and 4B show enlarged views of a IV(a) part and a IV(b) part in FIG. 2, respectively.

Moreover, FIG. 5 shows a vertical cross-sectional front view of the clamping band 1 wound around a fastening target 100.

As shown in FIG. 5, the clamping band 1 according to this embodiment is configured so as to stay wound around the fastening target 100 by an engagement of first and second latch claws 11a, 12a, which are respectively provided in a first regions 11 on one side in the longitudinal direction and a second region 12 on the other side in the longitudinal direction, in a state that the first region 11 is wound around the outer circumference of the fastening target 100 to overlap the second region 12 from radially outside.

The clamping band 1 is formed of a belt-like elongated material.

The clamping band 1 is formed of, for example, stainless steel having a plate thickness of 0.2 mm to 0.6 mm.

As shown in FIGS. 1, 3A, 3B, 4A and 4B, the clamping band 1 has a first latch claw opening 20 in the first region 11 on one side in the longitudinal direction and a second latch claw opening 25 in the second region 12 on the other side in the longitudinal direction.

The first and second latch claws 11a, 12a are raised in the directions perpendicular to the plate surface of the clamping band 1 by utilizing the first and second latch claw openings 20, 25.

That is, as shown in FIGS. 3A and 4A, the first latch claw opening 20 is formed from an outer end part 20a on one side in the longitudinal direction to an inner end part 20b on the other side in the longitudinal direction.

The outer end part 20a includes a first latch claw center portion 21 positioned in the center in the width direction to form the free end of the first latch claw 11a, and a pair of side portions 22 positioned on the respective sides in the width direction of the first latch claw center portion 21 and positioned more toward one side in the longitudinal direction (i.e., on the outer side in the longitudinal direction) than the first latch claw center portion 21 is.

On the other hand, as shown in FIGS. 3B and 4B, the second latch claw opening 25 is formed from an outer end part 25a on the other side in the longitudinal direction to an inner end part 25b on one side in the longitudinal direction.

The outer end part 25a includes a second latch claw center portion 26 positioned in the center in the width direction to form the free end of the second latch claw 12a, and a pair of side portions 27 positioned on the respective sides in the width direction of the second latch claw center portion 26 and positioned more toward the other side in the longitudinal direction (i.e., on the outer side in the longitudinal direction) than the second latch claw center portion 26 is.

As shown in FIGS. 3A to 5, the first latch claw 11a is formed by pressing a region 15a extending over a predetermined distance from the first latch claw center portion 21 toward one side in the longitudinal direction to bulge toward a direction in which the region 15a faces radially inward Rin when the clamping band 1 is wound.

The second latch claw 12a is formed by pressing a region 16a extending over a predetermined distance from the second latch claw center portion 26 toward the other side in the longitudinal direction to bulge toward a direction in which the region 16a faces radially outward Rout when the clamping band 1 is wound.

Thus, in this embodiment, only the first latch claw center portion 21 positioned in the center in the width direction of the outer end part 20a on one side in the longitudinal direction of the first latch claw opening 20 is pressed to form the first latch claw 11a, and the pair of side portions 22 positioned on the respective sides in the width direction of the first latch claw center portion 21 do not form the first latch claw 11a.

Likewise, only the second latch claw center portion 26 positioned in the center in the width direction of the outer end part 25a on the other side in the longitudinal direction of the second latch claw opening 25 is pressed to form the second latch claw 12a, and the pair of side portions 27 positioned on the respective sides in the width direction of the second latch claw center portion 26 do not form the second latch claw 12a.

According to this configuration, the heights of the first and second latch claws 11a, 12a (the bulging height of the first and second latch claws 11a, 12a above other regions) can be increased without difficulty.

With the clamping band 1 having the raised first and second latch claws 11a, 12a, workability of winding the clamping band 1 around the fastening target 100 to engage the first and second latch claws 11a, 12a is improved, and the clamping band 1 can securely stay wound around the fastening target 100.

As shown in FIGS. 4A, 4B and 5, in this embodiment, the bulging heights of the first and second latch claw center portions 21, 26 are greater than the plate thickness of the clamping band 1.

Preferably, the bulging heights of the first and second latch claw center portions 21, 26 are each greater than a plate thickness t of the clamping band 1 and less than 2×t, and are more preferably each 1.5×t.

As shown in FIGS. 1 to 4B, the clamping band 1 according to this embodiment has first and second tool engagement claws 11b, 12b in addition to the first and second latch claws 11a, 12a.

Specifically, as shown in FIGS. 3A, 3B, 4A and 4B, the clamping band 1 has a first tool engagement claw opening 30 on the other side in the longitudinal direction (on the inner side in the longitudinal direction) of the first latch claw opening 20, and a second tool engagement claw opening 35 on one side in the longitudinal direction (on the inner side in the longitudinal direction) of the second latch claw opening 25.

As shown in FIGS. 3A and 4A, the first tool engagement claw opening 30 is formed from an outer end part 30a on one side in the longitudinal direction to an inner end part 30b on the other side in the longitudinal direction.

The outer end part 30a includes a first tool engagement claw center portion 31 positioned in the center in the width direction to form the free end of the first tool engagement claw 11b, and a pair of side portions 32 positioned on the respective sides in the width direction of the first tool engagement claw center portion 31 and positioned more toward one side in the longitudinal direction (i.e., on the outer side in the longitudinal direction) than the first tool engagement claw center portion 31 is.

As shown in FIGS. 3A and 4A, the first tool engagement claw 11b is formed by pressing a region 15b extending over a predetermined distance from the first tool engagement claw center portion 31 toward one side in the longitudinal direction to bulge toward a direction in which the region 15b faces radially outward Rout when the clamping band 1 is wound.

On the other hand, as shown in FIGS. 3B and 4B, the second tool engagement claw opening 35 is formed from an outer end part 35a on the other side in the longitudinal direction to an inner end part 35b on one side in the longitudinal direction.

The outer end part 35a includes a second tool engagement claw center portion 36 positioned in the center in the width direction to form the free end of the second tool engagement claw 12b, and a pair of side portions 37 positioned on the respective sides in the width direction of the second tool engagement claw center portion 36 and positioned more toward the other side in the longitudinal direction (i.e., on the outer side in the longitudinal direction) than the second tool engagement claw center portion 36 is.

As shown in FIGS. 3B and 4B, the second tool engagement claw 12b is formed by pressing a region 16b extending over a predetermined distance from the second tool engagement claw center portion 36 toward the other side in the longitudinal direction to bulge toward a direction in which the region 16b faces radially outward Rout when the clamping band 1 is wound.

According to this configuration, the heights of the first and second tool engagement claws 11b, 12b (the bulging height of the first and second tool engagement claws 11b, 12b above other regions) can be increased without difficulty.

Accordingly, a tool can be easily and securely engaged with the first and second tool engagement claws 11b, 12b.

The clamping band 1 according to this embodiment can be wound around materials having various cross-sectional shapes, and can preferably have the following configuration in the case of winding the clamping band 1 around the fastening target 100 having such a shape that a width W is greater than a height H in a cross-sectional view (hereinafter referred to as a flat cross-sectional shape) as shown in FIG. 5.

That is, in the case where the fastening target 100 has a flat cross-sectional shape as shown in FIG. 5, easily bendable structures 50 can be each provided in a first position P1 halfway in the longitudinal direction between the first latch claw 11a and an intermediate position C halfway in the longitudinal direction between the first and second latch claws 11a, 12a, and a second position P2 halfway in the longitudinal direction between the intermediate position C and the second latch claw 12a as shown in FIG. 1.

By providing the easily bendable structures 50, the clamping band 1 can be effortlessly placed around the outer circumference of the fastening target 100 having a flat cross-sectional shape.

In this embodiment, first and second openings 51, 52 that respectively cross the first and second positions P1, P2 in the longitudinal direction are provided as the easily bendable structures 50.

Instead of or in addition to this, the easily bendable structures 50 can be formed by reducing the width of a region extending in the longitudinal direction to cross the first position P1 and the width of a region extending in the longitudinal direction to cross the second position P2 to widths that are smaller than those of other regions, or can be formed by reducing the thickness of a region extending in the longitudinal direction to cross the first position P1 and the thickness of a region extending in the longitudinal direction to cross the second position P2 to thicknesses that are smaller than those of other regions.

An example of the fastening target 100 having a width W greater than a height H in a cross-sectional view may be an assembly of a plastic hollow airbag member and a covering fabric that surrounds the airbag member built into an automobile seat belt.

DESCRIPTION OF THE REFERENCE NUMERALS 1 clamping band
11 first region
11a first latch claw
12 second region
12a second latch claw
20 first latch claw opening
21 first latch claw center portion
22 side portion
25 second latch claw opening
26 second latch claw center portion
27 side portion
50 easily bendable structure
51 first opening
52 second opening
C intermediate position
P1 first position
P2 second position

The invention claimed is:

1. A clamping band, which stays wound around a fastening target by an engagement of first and second latch claws, which are respectively provided in a first region on one side in a longitudinal direction and a second region on the other side in the longitudinal direction of the clamping band, in a state that the first region is wound around an outer circumference of the fastening target to overlap the second region from radially outside, comprising:

the first and second regions comprising first and second latch claw openings, respectively;

an end part on one side in the longitudinal direction of the first latch claw opening includes a first latch claw center portion positioned in a center in a width direction to form a free end of the first latch claw, and a pair of side portions positioned on respective sides in the width direction of the first latch claw center portion and positioned more toward one side in the longitudinal direction than the first latch claw center portion is;

an end part on the other side in the longitudinal direction of the second latch claw opening includes a second latch claw center portion positioned in the center in the width direction to form a free end of the second latch claw, and a pair of side portions positioned on respective sides in the width direction of the second latch claw center portion and positioned more toward the other side in the longitudinal direction than the second latch claw center portion is;

a first tool engagement claw opening for forming a first tool engagement claw provided on the other side in the longitudinal direction of the first latch claw opening, and a second tool engagement claw opening for forming a second tool engagement claw provided on one side in the longitudinal direction of the second engagement claw opening;

an end part on one side in the longitudinal direction of the first tool engagement claw opening includes a first tool engagement claw center portion positioned in the center in the width direction to form a free end of the first tool engagement claw, and a pair of side portions positioned on respective sides in the width direction of the first tool engagement claw center portion and positioned more toward one side in the longitudinal direction than the first tool engagement claw center portion is; and an end part on the other side in the longitudinal direction of the second tool engagement claw opening includes a second tool engagement claw center portion positioned in a center in a width direction to form a free end of the second tool engagement claw, and a pair of side portions positioned on respective sides in the width direction of the second tool engagement claw center portion and positioned more toward the other side in the longitudinal direction than the second tool engagement claw center portion is.

2. The clamping band according to claim 1, wherein the first and second latch claw center portions have bulging heights greater than a plate thickness of the clamping band.

3. The clamping band according to claim 1, wherein an easily bendable structure is provided in a first position halfway in the longitudinal direction between the first latch claw and an intermediate position halfway in the longitudinal direction between the first and second latch claws, and in a second position halfway in the longitudinal direction between the intermediate position and the second latch claw.

4. The clamping band according to claim 3, wherein a first opening that extends in the longitudinal direction across the first position and a second opening that extends in the longitudinal direction across the second position are provided as the easily bendable structure.

5. A clamping band for placement around an outer circumference of a fastening target, comprising:

a first region disposed on a first end of the clamping band;
a second region disposed on a second end of clamping band;
a first latch claw opening disposed in the first region;
a first end part disposed on one side in a longitudinal direction of the first latch claw opening, wherein the first end part comprises:
  a first latch claw center portion centered in a width direction of the first latch claw opening configured to form a free end of a first latch claw, and
  a pair of side portions positioned on respective sides of the first latch claw center portion, wherein the side portions are positioned longitudinally closer to one side of the first latch claw opening than the first latch claw center portion;
a second latch claw opening disposed in the second region;
a second end part disposed on one side in the longitudinal direction of the second latch claw opening, wherein the second end part comprises:
  a second latch claw center portion centered in a width direction of the second latch claw opening configured to form a free end of a second latch claw, and
  a pair of side portions positioned on respective sides of the second latch claw center portion, wherein the side portions are positioned longitudinally closer to one side of the second latch claw opening than the first latch claw center portion;
a first tool engagement claw opening disposed in the first region adjacent to the first latch claw opening on the side closer to the second region;
a first tool end part disposed on one side in the longitudinal direction of the first tool claw opening, wherein the first tool end part comprises:
  a first tool claw center portion centered in a width direction of the first tool claw opening configured to form a free end of a first tool engagement claw, and
  a pair of side portions positioned on respective sides of the first tool claw center portion, wherein the side portions are positioned closer to one side of the first tool claw opening than the first tool claw center portion;
a second tool engagement claw opening disposed in the second region adjacent to the second latch claw opening on the side closer to the first region; and
a second tool end part disposed on one side in the longitudinal direction of the second tool claw opening, wherein the second tool end part comprises:
  a second tool claw center portion centered in a width direction of the second tool claw opening configured to form a free end of a second tool engagement claw, and
  a pair of side portions positioned on respective sides of the second tool claw center portion, wherein the side portions are positioned closer to one side of the second tool claw opening than the second tool claw center portion.

6. The clamping band according to claim 5, wherein the first and second latch claw center portions have heights greater than a plate thickness of the clamping band.

7. The clamping band of claim 5, further comprising:
a first easily bendable structure disposed in a first position that is longitudinally halfway between the first latch claw opening and a longitudinal midpoint between the first latch claw opening and the second latch claw opening; and
a second easily bendable structure disposed in a first position that is longitudinally halfway between the second latch claw opening and a longitudinal midpoint between the first latch claw opening and the second latch claw opening.

8. The clamping band of claim 7, wherein the first easily bendable structure and the second easily bendable structure comprise an opening that extends partway along the band in a longitudinal direction.

* * * * *